(12) United States Patent
Pawlowsky (10) Patent No.: US 8,434,072 B2
(45) Date of Patent: Apr. 30, 2013

(54) AUTOMATIC RETRIEVAL OF TRANSLATED MESSAGES FOR INTERACTING WITH LEGACY SYSTEMS

(75) Inventor: Marc Pawlowsky, Kanata (CA)

(73) Assignee: International Business Machines Corporation, Armonk, NY (US)

(*) Notice: Subject to any disclaimer, the term of this patent is extended or adjusted under 35 U.S.C. 154(b) by 979 days.

(21) Appl. No.: 12/476,321

(22) Filed: Jun. 2, 2009

(65) Prior Publication Data

US 2010/0306747 A1 Dec. 2, 2010

(51) Int. Cl.
*G06F 9/44* (2006.01)
(52) U.S. Cl.
USPC .......................................................... 717/137
(58) Field of Classification Search .................. 717/136, 717/137
See application file for complete search history.

(56) References Cited

U.S. PATENT DOCUMENTS 7,418,390 B1* 8/2008 Jokipii ........................ 704/270.1
2009/0030673 A1* 1/2009 Chakra et al. ...................... 704/8

OTHER PUBLICATIONS

Zelenski, J. and Parlante, N., Computer Architecture: Take I, http://see.stanford.edu/materials/icsppcs107/12-Computer-Architecture.pdf, Apr. 18, 2008.*

* cited by examiner

*Primary Examiner* — Anna Deng
(74) *Attorney, Agent, or Firm* — Yee Tham; SVL IP Law Edell, Shapiro & Finnan, LLC (57) ABSTRACT

A translation system and method is described that may automatically translate strings of a legacy application for use in creating an interfacing application that can interface with the legacy application. The translation system and method receive a plurality of input strings from a string list and use an initial language library to associate an identifier with the input strings. The identifier is used to determine the translated version of the input string from additional language libraries. The determined translated strings are associated with the input strings.

13 Claims, 7 Drawing Sheets

```
         HelloWorld_Interface (){
     ┌── #set the language based on which language is selected in the GUI
272 ─┤
     └── language ← languageSelector.Selected ┌── CheckmarkButton_OnClick (){
     │              #send a message to the legacy application based
     │              #on the language and display the result
     │              if language = 'en-US'
274 ─┤                      displayBox_text ← HelloWorld_International('Hello')
     │              else if language = 'fr-FR'
     │                      displayBox_text ← HelloWorld_International('Bonjour')
     └── }CheckmarkButton ┌── ExitButton_OnClick () {
     │              #send a message to the legacy application based
     │              #on the language and display the result
     │              if language = 'en-US'
276 ─┤                      displayBox_text ← HelloWorld_International('Goodbye')
     │                      exit()
     │              elseif language = 'fr-FR'
     │                      displayBox_text ← HelloWorld_International('Au revoir')
     │                      exit()
     └── } ExitButton
         }HelloWorld_Interface
```

AUTOMATIC RETRIEVAL OF TRANSLATED MESSAGES FOR INTERACTING WITH LEGACY SYSTEMS

BACKGROUND

Legacy applications use specific input strings. For example, a method in a legacy application may check an input string for a match to "help". When matching the string, the legacy application may only match the identical string. For example, "help" would not match "Help".

Applications may have different versions to support different languages. While an English version of an application may match an input string with "help", the French version of the application may match an input string with "aide". The support for different languages may be accomplished using different resource libraries that include the translations of the strings required by the legacy application. The different versions of the legacy application can load and use the appropriate resource library to identify the correct string translation. For example, an English resource library may associate the string "help" with an identifier, such as a number. The French resource library may associate the same identifier number with the string "aide". The legacy application may then match the input string with the string associated with the identifier in the library that was loaded to use the appropriate string. The resource libraries may be a series of key:value pairs. Depending on the size of the program the resource library is used with, the resource library may have thousands or more key:value pairs. The resource libraries may also be used to provide translation of the strings displayed, for example as output.

New applications may be written to interface with an existing legacy application. For example, a Graphical User Interface (GUI) may be created to interface with an existing legacy system that accepts inputs from a command line. The new applications may be written against one version of a legacy application, but may need to interact with different versions of the legacy application. For example, the new application may provide an English interface based on the English version of the legacy application; however, the new application may also be required to provide a French interface that interfaces with the French version of the legacy application.

The translations required for interacting with the different interfaces, for example "help" and "aide", may be extracted directly from the source code of the different versions of the legacy application. In order to accomplish this, the behavior of the different versions of the legacy application can be examined and the corresponding source code examined to determine the required strings to use for a particular behavior in the different versions of the legacy application. If resource libraries are used in the legacy application, the source code may be examined to determine the identifier used, and then the resource library used to determine the strings required to interface with the legacy application.

The source code for the legacy application may not be available, or it may be difficult to examine and comprehend in order to determine the translation of the desired strings. It may also be expensive and time consuming to examine all of the code to determine the necessary strings.

There exists tools for aiding developers in internationalizing an application. These tools may for example replace string references found in the source code with identifiers that reference a library that associates the identifier with the string (or its translation). The identifiers and associated strings are typically stored in a file that can be loaded for the correct language version. The tools typically produce a different library for each language the program will be translated to. While the language libraries are useful for internationalizing and localizing an application, they may be large as they comprise all the strings used by the program. For example, strings used to match input commands, strings used to display on buttons, strings used to display as messages, strings of errors, strings on menus etc.

SUMMARY

A translation system is described herein that may automatically translate strings of a legacy application for use in creating an interfacing application that can interface with the legacy application. The translation system comprises a computer readable medium storing instructions and data and a processor executing the instructions stored in the computer readable medium. The instructions when executed by the processor providing a string list comprising one or more input strings to be translated; an initial language library comprising a plurality of string:ID pairs of strings used by the legacy application; one or more additional language libraries comprising a plurality of string:ID pairs of the strings used by the legacy application, the string of the string:ID pair corresponding to a translated string of the string associated with a corresponding ID of a string:ID pair of the initial language library; and a controller determining an identifier associated with an input string of the string list, the identifier determined from the initial language library, and the controller determining translated string versions of the input string of the string list, the translated string versions determined from the one or more additional language libraries using the determined identifier associated with the input string.

A method of automatically translating strings of a legacy application for use in creating an interfacing application for interfacing with the legacy application is further described herein. The method comprises receiving at a computer a string list comprising one or more input strings to be translated; receiving at the computer an initial language library comprising a plurality of string:ID pairs of strings used by the legacy application; receiving at the computer one or more additional language libraries comprising a plurality of string:ID pairs of the strings used by the legacy application, the string of the string:ID pair corresponding to a translated string of the string associated with a corresponding ID of a string:ID pair of the initial language library; determining an identifier associated with an input string of the string list, the identifier determined from the initial language library; determining translated string versions of the input string of the string list, the translated string versions determined from the one or more additional language libraries using the determined identifier associated with the input string; and storing the determined translated string versions in a computer readable memory.

A computer program product for automatically translating strings of a legacy application for use in creating an interfacing application to interface with the legacy application, is further described herein. The computer program product comprises a computer usable medium having computer usable program code embodied therewith. The computer usable program code comprises computer usable program code configured to receive a string list comprising one or more input strings to be translated; computer usable program code configured to receive an initial language library comprising a plurality of string:ID pairs of strings used by the legacy application; computer usable program code configured to receive one or more additional language libraries comprising a plurality of string:ID pairs of the strings used by the legacy application, the string of the string:ID pair corresponding to a translated string of the string associated with a corresponding ID of a string:ID pair of the initial language library; computer usable program code configured to determine an identifier associated with an input string of the string list, the identifier determined from the initial language library; computer usable program code configured to determine translated string versions of the input string of the string list, the translated string versions determined from the one or more additional language libraries using the determined identifier associated with the input string; and computer usable program code configured to store the determined translated string versions in a computer useable memory.

BRIEF DESCRIPTION OF THE SEVERAL VIEWS OF THE DRAWINGS

FIG. 1b shows a pseudo code listing of the illustrative legacy application of FIG. 1a;

FIG. 2b depicts an illustrative display screen of the interface application of FIG. 2a;

FIG. 6 depicts in a block diagram illustrative components of a computer that a translation system as described herein may be implemented with.

DETAILED DESCRIPTION

The system and method described herein relate in general to the internationalization and localization of an application that interfaces with internationalized and localized versions of a legacy application. The system and method focus on the translation of strings required by the different versions of the applications. Other problems or considerations with the internationalization and localization of applications are not considered in detail here. For example, the full internationalization of the application may require formatting considerations such as the formatting of numbers or dates. Similarly, there may be other considerations such as the use of different currencies, measurements, etc. One of ordinary skill in the art will understand that it is possible to extend the teachings herein to account for these additional considerations if they are required or desired for a particular application.

The system and method are described herein with reference to a simple, contrived application to highlight and clearly describe the concepts in such a manner to allow one of ordinary skill in the art to apply them to a broad range of applications and systems.

Figure 1A:
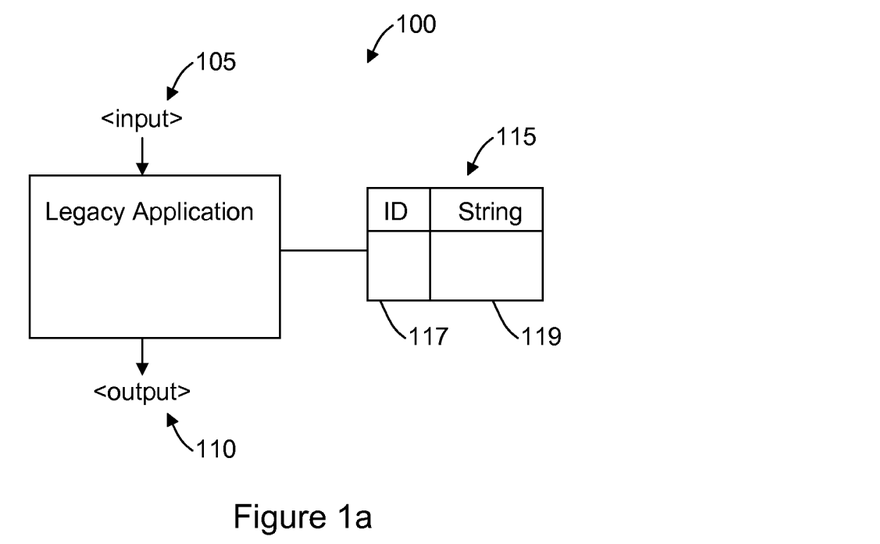
FIG. 1a depicts in a block diagram logical components of an illustrative internationalized legacy application.

FIG. 1a depicts in a block diagram logical components of an illustrative internationalized legacy application 100. The legacy application 100 receives an input 105 and processes it to produce an output 110. The input may be received from an input device such as a keyboard, mouse, stylus, touch screen or other input devices as commonly known to one of ordinary skill in the art. The output may be displayed on an output device such as a monitor, speaker, printer, or other output devices as commonly known to one of ordinary skill in the art. A language library 115 is used to provide a translation of strings used by the legacy application 100. By replacing the language library 115 with a different language library (not shown), for example having the French translation of the strings used by the legacy application 100, it is possible to provide a French version of the legacy application 100 without requiring changes to the core logic of the legacy application 100 itself. The language library 115 associates an identifier 117 with a string 119. The same identifier 117 is used in different language libraries to associate the identifier 117 with the translation of the string 119.

Figure 1B:
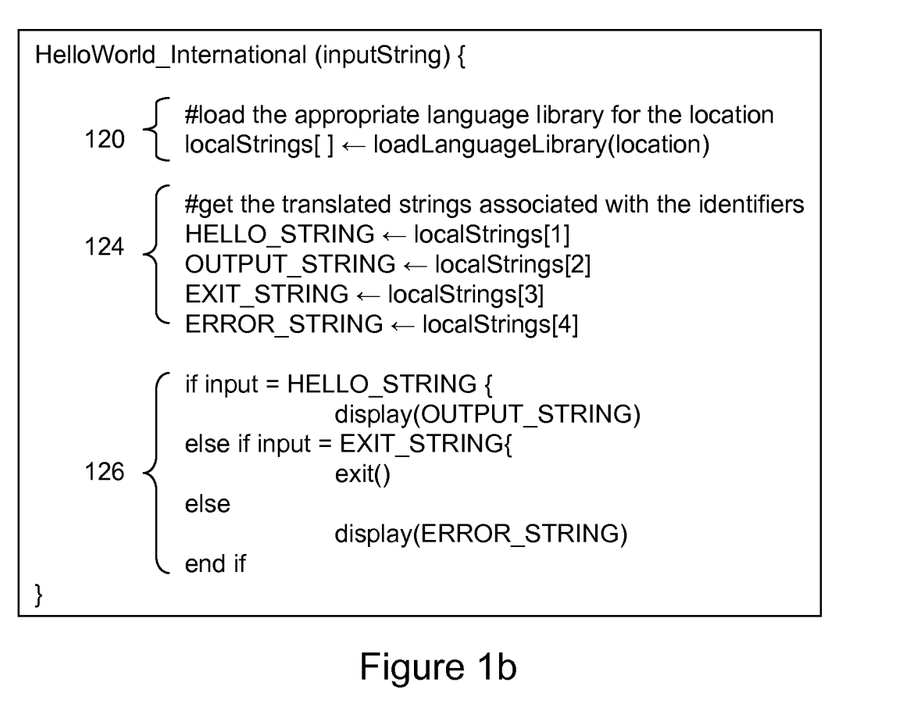
Figure 1C:
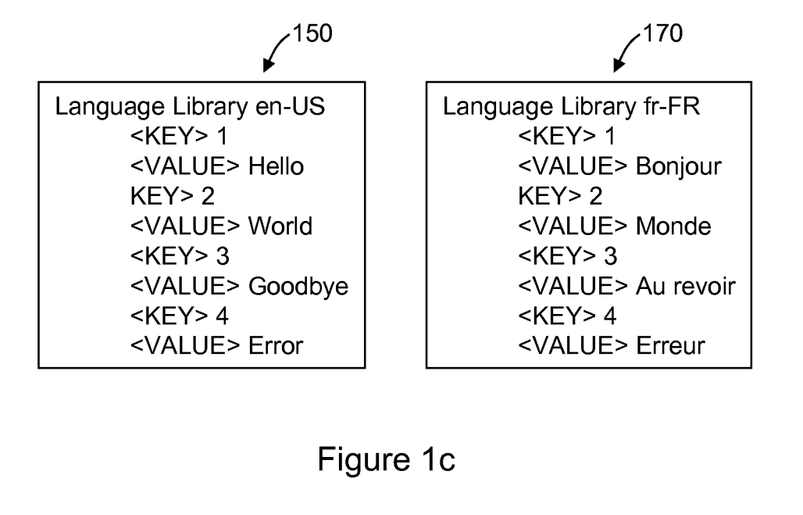
FIG. 1c shows a pseudo code listing of two illustrative language libraries used by the illustrative legacy application of FIGS. 1a, 1b.

FIGS. 1b and 1c show a pseudo code listing of the illustrative legacy application 100, and a pseudo code listing of two language libraries 150,170 that could be used with the legacy application 100 to provide an English and French version. The legacy application pseudo code of FIG. 1b is contrived for illustrative purposes and does not conform to any particular programming language. The legacy application pseudo code describes a command line program that allows a user to type in commands at a prompt. In the English version, if the user types in the string "Hello" the legacy application will output the string "World". If the user inputs the string "Goodbye" the application exits. If the user inputs any other string, the application outputs the string "Error". The French version is identical, however the input and output strings have been translated to French. It is understood the core logic, which may consist of computer programming language code or computer instructions, of the legacy application is not changed for the different language versions, rather it is the language library that the legacy application uses that provides the translation of the strings.

The pseudo-code listing of the legacy application loads 120, an appropriate language library 150, 170. The appropriate language library to use may be determined in various ways, for example, a user of the legacy application may indicate what language library to use, the legacy application may determine the location of the user through other software, such as an operating system supporting the execution of the legacy application 100. It may further be possible to determine the location of the user based on global position systems (GPS) or geo location servers if the legacy application 100 is accessed over, or connected to the Internet.

The pseudo code listing of the legacy application 100, loads the strings of the language library into the respective variables 124. One of ordinary skill in the art will appreciate that the strings may be loaded into the variables for convenience and the readability of the code of the legacy application. The strings could be used without the use of the variable holders.

The legacy application 100 can use 126 the strings loaded into the variables to provide a translated representations of the legacy application by simply changing the language library 150, 170 used to determine the strings.

Figure 2A:
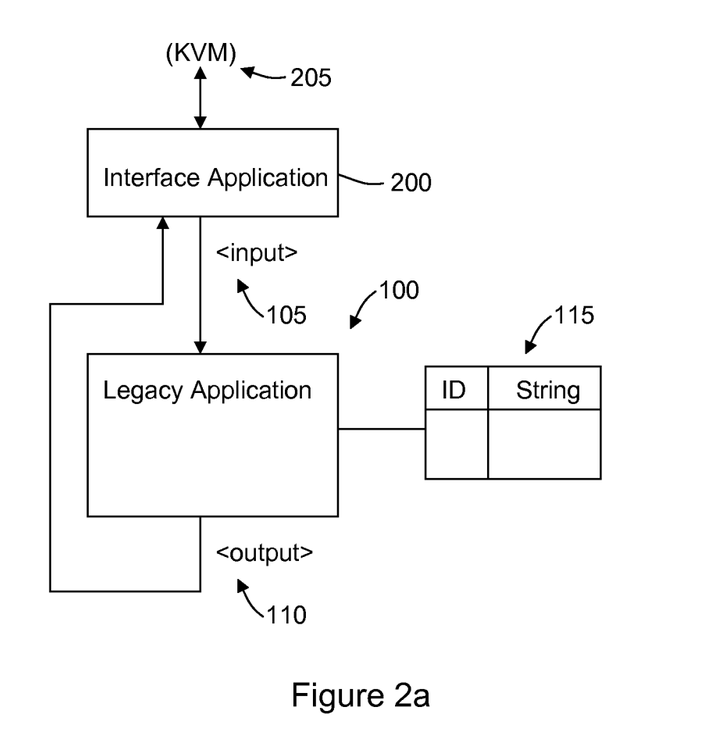
FIG. 2a depicts in a block diagram an illustrative interface application that may interface with the illustrative legacy application of FIGS. 1a, 1b, 1c.

FIG. 2a depicts in a block diagram an illustrative interface application 200 that interfaces with the legacy application 100 to provide a graphical user interface to the legacy application 100. Although described as providing a GUI to a command line legacy application, the system and method are not limited to such an application. The system and method may be used when interfacing an application with a legacy application, regardless of the functionality of either the new interface application of the legacy application. The interface application 200 receives input from a user via an input device depicted as a keyboard, video or mouse (KVM) 205, or other means such as over a network or from additional software, such as a supporting OS, and generates an input to the legacy application 100. The interface application 200 receives the resultant output 110 from the legacy application 100 and processes it, for example by displaying it to the user via an output device depicted as the KVM 205.

Figure 2B:
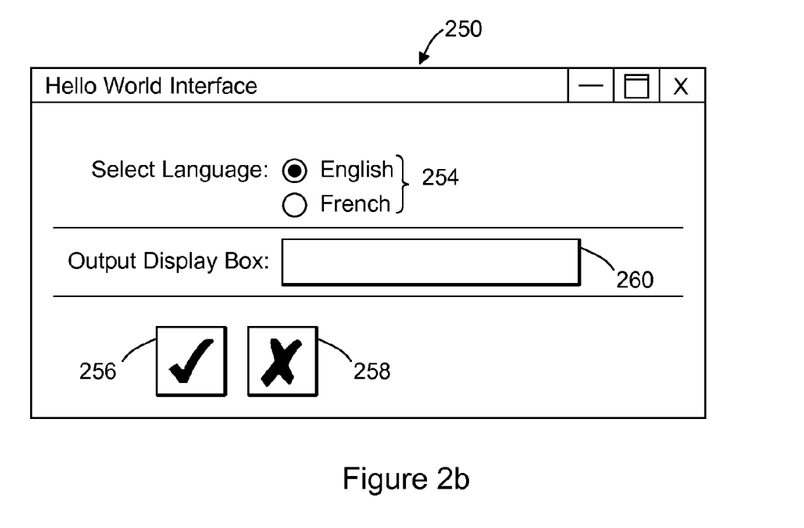

FIG. 2b depicts an illustrative display screen of the interface application. The interface application 200 comprises a display window 250 for displaying a graphical user interface (GUI) of the interface application 200. The window comprises two radio buttons for selecting the language used by the interface application, an output box 260 for displaying output of the interface application, which may be received from the legacy application 100, a check mark button 256 and an X button 258.

Figure 2C:
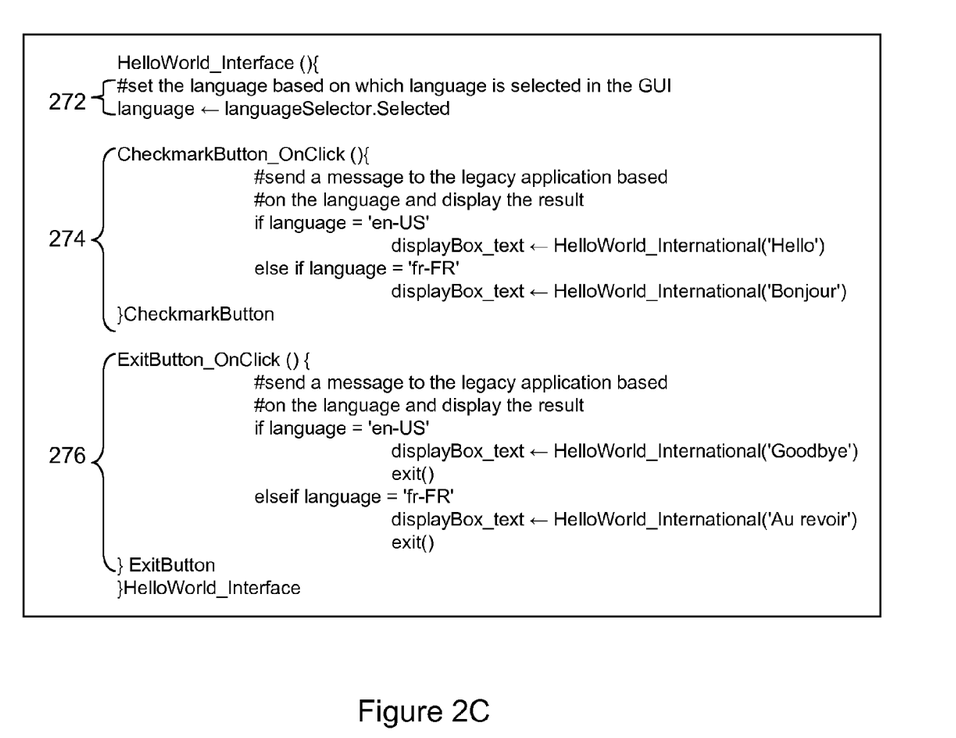
FIG. 2c is a pseudo code representation of the interface application of FIGS. 2a and 2b.

FIG. 2c is a pseudo code representation of the interface application 200, which has a display window 250 as depicted in FIG. 2b. A user of the interface application may click on the check-mark button 256 which causes the CheckmarkButton_OnClick functionality 274 to be called. The CheckmarkButton_OnClick function sends a message to the legacy application based on the selected language of the interface application 276. The language of the strings used by the interface application 200 is selected to match the version of the legacy application 100 it is interfacing with. For example, the interface application may change the language of the labels used by the GUI. The language of the interface application may be set 272 by selecting the appropriate radio button 254. For example, if the language is English, the interface application will send the input string "Hello" to the English version of the legacy application 100 when the checkmark button is clicked and will receive the response output from the legacy application, which in this example is "World". The interface application may then display the received output in the text box 260. If the user clicks on the X button 258 the ExitButton_OnClick function 276 will be called and the interface application 200 will send the input "goodbye" to the legacy application 100, which will exit the legacy application. The response received from the legacy application is displayed in the text box 260 prior to the interface application exiting.

The interface application 200 may send different inputs, and receive different outputs from the legacy application 100, based on the version of the legacy application it is interfacing with. For example if the interface application is interfacing with a French version, selected by radio buttons 254, of the application, it may send "Bonjour" or "Au revoir".

Figure 3:
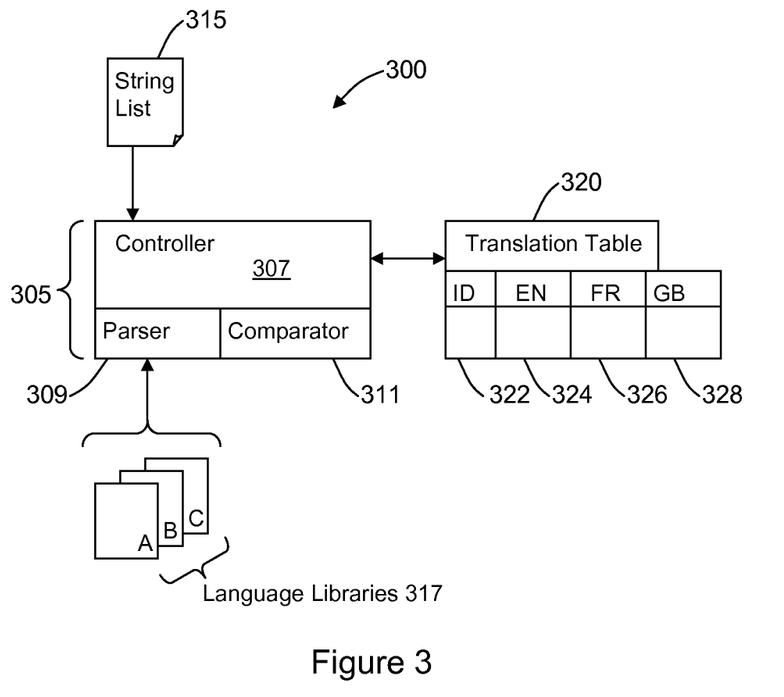
FIG. 3 depicts in a block diagram illustrative components of a translation system for automatically translating strings of a legacy application.

FIG. 3 depicts in a block diagram illustrative components of a translation system 300 for automatically translating strings of a legacy application 100 for use in creating an interfacing application 200. The legacy application 100 that is being interfaced with is assumed to have multiple versions in different languages provided by the use of different language libraries 317a, 317b, 317c (collectively referred to as language libraries 317). Each of the language libraries 317 associates a string with a respective identifier. The same identifier is associated with the translated version of the string in each of the different language libraries 317. The legacy application 100 may then determine the appropriate translated string to use by using the identifier and the appropriate language library 317. The system 300 comprises a main business logic component 305 that includes a controller module 307 that co-operates with a parser module 309 and a comparator module 311. The business logic component 305 receives a list of strings 315 that are to be translated and produces a translation table 320. The translation of the strings of the string list 315 are determined directly from the different versions of the language libraries 317 of the legacy application 100.

The controller module 307 controls the operation of the translation system 300. The controller module 307 loads the strings from the string list 315 that are to be translated. The controller module 307 may generate a data structure for storing the strings to be translated, identifiers associated with the strings, as well as the translated strings. As shown in FIG. 3, the data structure may be a table 320 that includes a column for storing an identifier 322 associated with a string, as well as columns 324,326,328 for storing the translated string for each of the different languages for which a language library 317 is available (and the interface application is to be translated to). Each row 324, 326, 328 stored in the table associates an identifier with the different translations of the string. It is understood that while the data structure is depicted as a table, other data structures may be used to associate the identifiers with the translated strings. Furthermore, the data structure may store information in addition to the identifier and translated strings.

The parser module 309 is used by the controller module 307 to load the various language libraries and parse the information into a plurality of key:value pairs. The key is the identifier, or corresponds to the identifier, and the value is the translated string associated with the identifier. The parser module 309 may load and parse a single language library 317 at a time, or it may load and parse multiple language libraries 317 at once. Additionally, the parser module 309 may load and parse the language libraries 317 in their entirety or may only load or parse a portion of the language libraries 317. The parser module 309 may be controlled by the controller module 307. The controller module 307 uses the parsed key:text pairs to determine the translation of the strings in the string list 315.

The comparator module 311 may be used to compare an input string loaded from the string list 315 to parsed strings of a language library 317 to determine an associated identifier. The comparator module 311 compares the input string against the strings stored in one of the language libraries 317 in order to determine the identifier associated with the input string. The input language library used during the string comparison is selected to match the language of the input string in the string list. This is typically the language used by the developers of the interface application 200.

The comparator module 311 may use different comparison levels to compare the input string from the string list. For example, the first level may only match the input string with an identical string in the language library 317. If no matches are found using the first level comparison, a second level of comparison may be used to provide a more relaxed comparison that will, for example, match strings without regards to their case. It is understood that additional levels may be used as well. For example, if no matches are found using the second level comparison, a third level comparison may be performed that matches the strings taking into account spelling mistakes, so that "help" would be matched "jelp". The comparator module 311 may provide the match result, or results, back to the controller module 307. The comparator module 311 may also return additional information such as the comparison level the strings were matched at. The comparator module 311 may store the matched string and the associated identifier in the data structure, for example table 320. Alternatively, the controller module 307 may be responsible for storing the matched string and associated ID in the data structure. The data structure may store the string and associated identifier determined by the comparator module 311 in a row of a table 320. The data structure may store additional information, such as the matching level the string was matched at, the input string from the string list if it is not identical to the matched string, whether additional matches were made, the number of matches found for the input string, etc.

Once the comparator module 311 has determined and stored the identifiers associated with the input strings from the string list and the information has been stored in the data structure, or at least all of the strings for which matches were found, the controller module 307 may use the identifiers to determine the translated strings from the additional language libraries 317 which have been loaded and parsed by the parser module 309. It is understood that the parser module 309 may load and parse language libraries as they are required, or alternatively all the available language libraries may be loaded and parsed at the same time. The controller module 307 may associate the identifiers from the comparator module 311 with the translated strings from the parsed language libraries 317 provided by the parser module 309 by storing them in the data structure, for example the translation table 320.

Figure 4:
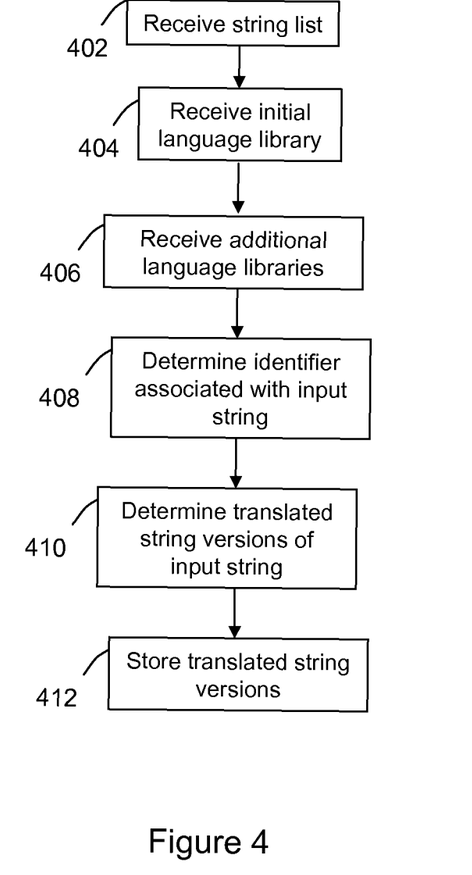
FIG. 4 depicts in a flow chart an illustrative method of generating translated strings of a legacy application.

FIG. 4 depicts in a flow chart an illustrative method of generating translated strings of a legacy application from the language libraries 317. The method 400 receives at a computer a string list comprising one or more input strings to be translated (402). The method 400 further receives at the computer an initial language library comprising a plurality of string:ID pairs of strings used by the legacy application (404). The method 400 further receives at the computer one or more additional language libraries comprising a plurality of string:ID pairs of the strings used by the legacy application, the string of the string:ID pair corresponding to a translated string of the string associated with a corresponding ID of a string:ID pair of the initial language library (406). The method 400 then determines an identifier associated with an input string of the string list, the identifier determined from the initial language library (408). The method 400 further determines translated string versions of the input string of the string list, the translated string versions determined from the one or more additional language libraries using the determined identifier associated with the input string (410). The method 400 further stores the determined translated string versions in a computer readable memory (412).

Figure 5:
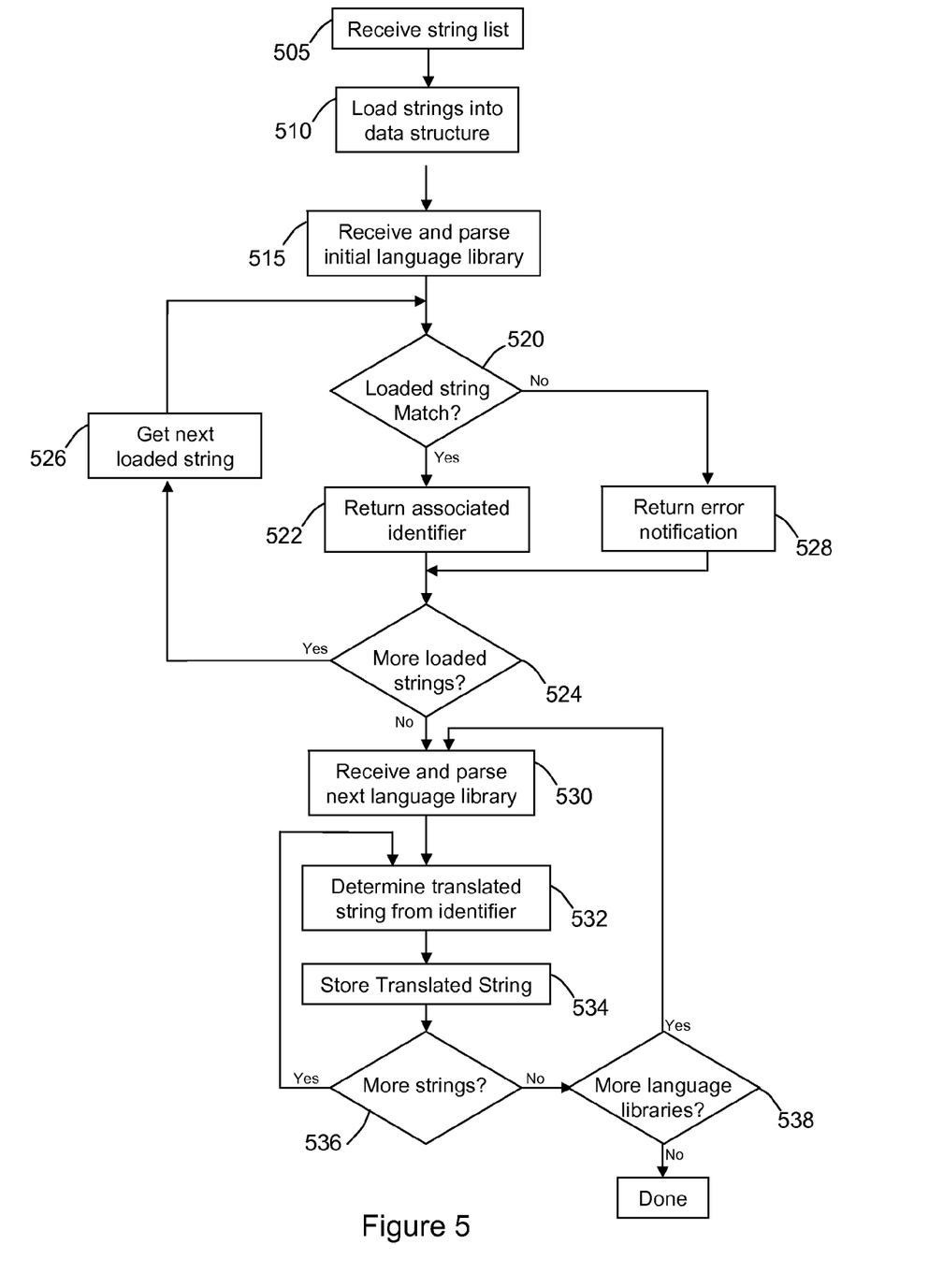
FIG. 5 depicts in a flow chart an illustrative method of generating translated strings of a legacy application.

FIG. 5 depicts in a flow chart an illustrative method of generating translated strings of a legacy application from the language libraries 317. The illustrative method of FIG. 5 may be considered a more detailed method of the illustrative method described above with reference to FIG. 4. In the following example of translating the strings, for the sake of clarity it is assumed that the initial language is English. One of ordinary skill in the art will understand that the strings could be received in different a language. The controller module 307 receives a list of strings that require translating (505), referred to as input strings. The system loads the input strings into a data structure that allows the individual input strings to be identified (510). For example, the data structure could be a table with the individual input strings being stored in rows of a column of the table. The system receives the initial language library 317, which in this example is the English library, and uses the parser module 309 to parse the initial language library and identify the strings of the initial language library and their associated identifiers (515). Receiving the initial language library may comprise loading the initial language library from memory or receiving the initial language library from another location. The comparator module 311 is used to match the input strings requiring translation (520), namely the input strings loaded from the string list, with the strings of the loaded language library. Once a match is found (Yes at 520), the identifier associated with the matched string in the language library 317 is returned and stored in the data structure to associate the identifier with the input string requiring translation (522). If for example, the input strings are stored in a column of a table, the identifier could be stored in a different column of the same table, and associated with the input string and translated strings by being stored in the same row as the input string and the translated strings. The identifier for each input string is determined by matching the input string, from the string list, with a string in the initial language library used for determining the identifiers associated with input strings, which may store the string and associated identifier as a key:value or id:string pair.

Once the matched identifier is returned and stored, it is determined if there are more input strings in the string list that are required to be matched with identifiers (524). If there are more input strings to be matched (Yes at 524), the next input string is retrieved (526) and processing returns to determining if there is a match in the language library (520). If no match is found (No at 520), an error is returned (528) to the control unit 307. As previously described, it is possible to perform different levels of matching in which case an error may be returned if no matches are found by all of the levels. Once the error is returned, processing continues to determine if there are more input strings to be matched (No at 524). The method may then begin to determine the translations of the input strings that have been matched in the initial language library and so associated with an identifier.

The system 300 may process the additional language libraries 317, for example, French and German. The processing may include the system 300 receiving and parsing an additional language library to identify the individual strings and their associated identifiers (530). For each of the input strings stored in the data structure, the associated identifier, determined using the initial language library, is matched with an identifier from the additional language library to determine the translated string. The identifier associated with the input string is found in the additional language library and the translated string associated with the matched identifier in the additional language library 317 is stored in the data structure and associated with the identifier and so the input string (534). The processing determines if there are more input strings stored in the data structure to translate (536) and if there are (Yes at 536) continues to translate them by finding the string associated with the identifier. If there are no more strings to translate (No at 536) the processing then determines if there are more language libraries (538) and if there are (Yes at 538) processing returns to load the next language library (530). Once there are no more language libraries to process (No at 538) the method is done. Once all of the identifiers in the data structure have been matched in the different language libraries 317, and the associated translated strings stored in the data structure, the resultant data structure, for example the translation table 320, can be used to provide the translation of the strings required to interface with the different versions of the legacy application 100. The translation table 320 may be used directly or indirectly by internationalization/localization tools or interface application programmers to provide an interface application in different languages Using the translated strings stored in the data structure, such as the translation table 320 it is possible to create an interface application that is capable of interfacing with the different language versions of the legacy application. Using the example interface application, the translation table 320 would provide the information that instead of using the string "Hello" as input, when interfacing with the French language version of the legacy application 100, the input string used should be "Bonjour".

The 'Hello World' example set forth herein is used to help describe the functioning of the system and method for translating strings using pre-existing language libraries. However, while the simplified example describes the functioning of the system and method, some of the advantages of the system and method may not be readily apparent from the simplified example. With the simplified example used to describe the functioning of the system and method, it could be possible for a developer to look at the language library and readily determine the purpose of each of the 3 strings found within it. However, in some legacy applications the number of strings in the language library may prevent the effective scanning and identification of the strings used in the application. The system and method described herein provide a way to translate strings used by a legacy application by receiving an input string list, which may be created through interactions with the preferred language version of the legacy application. Using the input string list, and the system and method described herein, it is possible to find the exact string translation used by the legacy application by determining an identifier associated with the string using an initial language library and using the identifier to determine the string translation from additional language libraries.

As described above, multiple levels of comparisons may be used to provide more relaxed input string matching. Additionally, it may be possible for a language library to include multiple copies of the same string. For example, one copy of the string "Hello" may be used to refer to an input string, while another string "Hello" refers to the string to display in a menu. Although the strings are identical in one language, it may be desirable to have them translated differently in different languages. As such, the string "Hello" may be associated with two different identifiers and so be translated into two different strings, for example "Bonjour" and "Salut". The system and method may continue checking for additional matches even after a first match has been found to find all identifiers associated with the input string. The matching of the identifiers will result in finding all of the translations for the string used in the different languages. The searching for additional identifiers may be based on the different levels of searching. In addition to the illustrative matching levels described above, it is possible to stop the searching at any particular level as soon as a match is found, or it may continue until the entire language library has been searched. It is possible that all matches to a string should be treated as the same, so that "Help" and "help" are considered the same. Alternatively the matches may be treated as different strings and each added to the data structure. Additionally, if the match is performed to account for spelling or typing errors, the matching may consider words matched with spelling errors the same.

If the same input string is associated with multiple identifiers, the results of the translation table may indicate which identifiers are associated with the same input string. Once all of the translations of the strings are determined, it may be possible to process the input strings with multiple identifiers associated with them to determine if the same translation is used in each language. For example, if the string "Hello" is associated with two identifiers in the initial language library, the results may be processed to determine if the translated string, determined using the additional language libraries, is the same in each language library for each identifier. That is, are both identifiers translated to "Bonjour" or is one translated to "Bonjour" and the other to "Salut". If the translation strings are identical, the results may be modified to include only one of the identifiers and its translation.

A developer may use the translation table when creating an interface application that interfaces with different language versions of a legacy application. The strings of the translation table may be used directly in the code of the interface application. This is shown in the illustrative interface application 200 described herein. The translation table may also be used to generate language libraries for the interface application 200.

Figure 6:
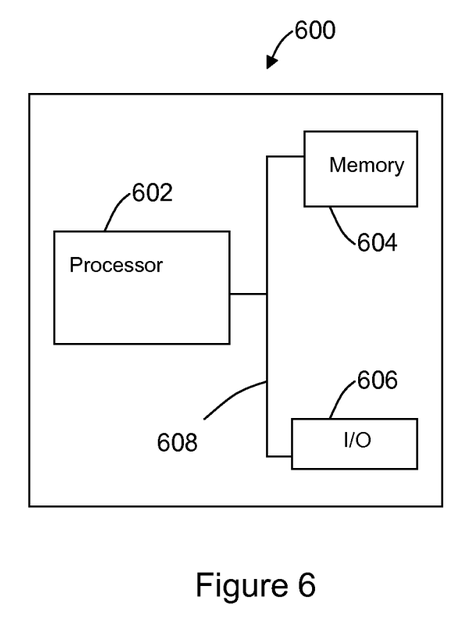

FIG. 6 depicts in a block diagram, illustrative components of a computer that may be used to implement the system and method described herein. The computer 600 comprises a processor 602 operationally coupled to a memory 604. The processor 602 may also be operationally coupled to one or more input/output (I/O) devices 606, such as the KVM 205. The processor 602 may be coupled to either the memory 604 and/or the I/O device 606 by one or more buses 608.

The processor 602 may be a central processing unit (CPU), a microprocessor, an application specific integrated circuit (ASIC), a field programmable gate array (FPGA) or other type of processor capable of executing instructions. The processor may include the hardware and controlling code such as firmware or basic input/output system (BIOS) used to configure the processor 602 and other components of the computer 600. The processor 602 may be implemented in one or more physical packages. Each package may include one or more processor cores for executing instructions.

The memory 604 may include different levels of memory, including both volatile and non-volatile memory for storage of information. The memory 604 may include, for example, registers for storing instructions to be executed by the processor 602, flash memory, electrically erasable programmable read only memory (EEPROM), random access memory (RAM), hard disk drives (HDD), solid state drives (SSDs), or other types of devices for storing information. The memory 604 may store the instructions to be executed by the processor to provide the system and method described herein. The instructions may be stored in different levels of the memory at the same time. For example, an instruction may be copied from a HDD to RAM to a register of the processor 600 prior to being executed by the processor 600. The results of processing the instruction or instructions may be stored in memory 604, Storing the instructions of the system and method described herein in the memory 604 alters one or more characteristics of the memory, such as the electrical characteristics of one or more cells of the memory 604.

The I/O devices 606 may include input and output devices. Input devices may include devices for inputting information to the computer 600, for example, mice, keyboards, keys, switches, cameras, scanners, microphones, touch panels or screens, or other input devices as known by one of ordinary skill in the art. The output devices may display or convey information and may include for example monitors, televisions, Braille devices, lights, printers, speakers, actuators and other output devices as known by one of ordinary skill in the art.

The buses 608 may include one or more buses for connecting the memory 604 and I/O devices 606 with the processor, or each other. The buses may be internal or external buses and may include the physical connectors required to connect components to the buses 608. Different buses are known, and may include for example peripheral component interconnect (PCI), PCI express (PCIe), industry standard architecture (ISA), advanced technology attachment (ATA), serial ATA (SATA), small computer system interface (SCSI), universal serial bus (USB), IEEE 1394 (FireWire™). The buses may also include buses for controlling the computer such as a front side bus (FSB), address bus, or control bus.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functionality. It should also be noted that, in some alternative implementations, the functionality noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functionality or acts, or combinations of special purpose hardware and computer instructions.

What is claimed is:

1. A translation system comprising:
  a computer storage device storing instructions and data;
  a processor executing the instructions stored in the computer storage device, the instructions when executed by the processor providing:
  a controller determining an identifier for an input string from a first language library, and the controller determining a translated string version of the input string from a second language library using the determined identifier, wherein the first language library and the second language library include common identifiers for corresponding strings;
  a parser parsing string:ID pairs from the first and second libraries;
  wherein the controller determining the identifier for the input string comprises comparing the input string to a string of the parsed string:ID pairs, and assigning an ID of the parsed string:ID pairs to the identifier for the input string when the input string matches the parsed string of the parsed string:ID pairs; and wherein the controller determining the translated string version of the input string comprises comparing the determined identifier for the input string to an identifier of the parsed string:ID pairs of the second language library, and assigning a string of the parsed string:ID pairs of the second language library to the translated string version when the determined identifier for the input string matches the identifier of the parsed string:ID pairs of the second language library.

2. The translation system as claimed in claim 1, wherein the controller stores translated string versions in a data structure that associates the translated string versions with the input string.

3. The translation system as claimed in claim 2, wherein the data structure comprises a table with the translated string versions and the input string stored in separate columns of a common row.

4. The translation system as claimed in claim 2, wherein the data structure is output by the translation system to use in creating an interface application that interfaces with different language versions of a legacy application.

5. The translation system as claimed in claim 1, wherein the processor comprises a central processing unit (CPU) capable of executing a plurality of instructions from an instruction set, and wherein the memory, including a plurality of registers, stores the instructions to be executed by the CPU, the instructions selected from the plurality of instructions defined in the instruction set of the CPU.

6. A computer-implemented method comprising:
   determining an identifier for an input string from a first language library;
   determining a translated string version of the input string from a second language library using the determined identifier, wherein the first language library and the second language library include common identifiers for corresponding strings; and
   parsing string:ID pairs from the first and second language libraries;
   wherein determining the identifier for the input string comprises comparing the input string to a string of the parsed string:ID pairs, and assigning an ID of the parsed string:ID pairs to the identifier for the input string when the input string matches the parsed string of the parsed string:ID pairs; and
   wherein determining the translated string version of the input string comprises comparing the determined identifier for the input string to an identifier of the parsed string:ID pairs of the second language library, and assigning a string of the parsed string:ID pairs of the second language library to the translated string version when the determined identifier for the input string matches the identifier of the parsed string:ID pairs of the second language library.

7. The method as claimed in claim 6, further comprising storing translated string versions in a data structure that associates the translated string versions with the input string.

8. The method as claimed in claim 7, wherein storing the translated string versions comprises storing the translated string versions and the input string in separate columns of a common row of a table.

9. The method as claimed in claim 7, further comprising outputting the data structure to use in creating an interface application to interface with different language versions of a legacy application.

10. A computer program product comprising:
    a computer storage device having computer usable program code embodied therewith, the computer usable program code comprising:
    computer usable program code configured to determine an identifier for an input string from a first language library;
    computer usable program code configured to determine a translated string version of the input string from a second language library using the determined identifier, wherein the first language library and the second language library include common identifiers for corresponding strings; and
    computer usable program code configured to pairs string:ID pairs from the first and second language libraries;
    wherein the computer usable program code configured to determine the identifier for the input string comprises computer usable program code configured to compare the input string to a string of the parsed string:ID pairs, and computer usable program code configured to assign an ID of the parsed string:ID pairs to the identifier for the input string when the input string matches the parsed string of the parsed string:ID pairs; and
    wherein the computer usable program code configured to determine the translated string version of the input string comprises computer usable program code configured to compare the determined identifier for the input string to an identifier of the parsed string:ID pairs of the second language library, and computer usable program code configured to assign a string of the parsed string:ID pairs of the second language library to the translated string version when the determined identifier associated with the input string matches the identifier of the parsed string:ID pairs of the second language library.

11. The computer program product as claimed in claim 10, wherein the computer usable program code further comprises computer usable program code configured to store translated string versions in a data structure that associates the translated string versions with the input string.

12. The computer program product as claimed in claim 11, wherein the computer usable program code configured to store the translated string versions comprises computer usable program code configured to store the translated string versions and the input string in separate columns of a common row of a table.

13. The computer program product as claimed in claim 11, further comprising computer usable program code configured to output the data structure to use in creating an interface application to interface with different language versions of a legacy application.

* * * * *